(12) United States Patent
West

(10) Patent No.: US 7,111,836 B1
(45) Date of Patent: Sep. 26, 2006

(54) UNIVERSAL WORK POSITIONING DEVICE

(76) Inventor: James C. West, 3462 Bernardino La., Vista, CA (US) 92084

( * ) Notice: Subject to any disclaimer, the term of this patent is extended or adjusted under 35 U.S.C. 154(b) by 0 days.

(21) Appl. No.: 11/346,143

(22) Filed: Feb. 2, 2006

(51) Int. Cl.
*B23Q 1/04* (2006.01)

(52) U.S. Cl. ..................................................... 269/75

(58) Field of Classification Search ................. 269/75, 269/20, 81–83; 248/181.1, 181.2, 288.31, 248/288.51, 180, 481, 483
See application file for complete search history.

(56) References Cited

U.S. PATENT DOCUMENTS 5,957,445 A * 9/1999 Hagman et al. ............... 269/75

* cited by examiner

*Primary Examiner*—Robert C. Watson
(74) *Attorney, Agent, or Firm*—David B. Waller & Associates

(57) ABSTRACT

The present invention is a workpiece positioner comprising a spherical ball having an aperture, a upper spherical dome housing having a groove through the housing beginning at the apex of the dome and extending down the side of the housing to approximately 90 degrees from the apex. The ball is positioned within the housing. A spherical seat is positioned against the ball. At least one tension disc spring is positioned against the seat. A radial braking means is positioned against the spring. A flange ring is affixed to the base of the housing securing the ball, seat, at least one spring and braking means in place within the housing. A base is secured to the braking means. An actuator lever is connected to the seat through the base. A cam and handle assembly is connected to the lever and a rod is affixed within the aperture of the ball.

4 Claims, 2 Drawing Sheets

C

D

B

A

UNIVERSAL WORK POSITIONING DEVICE

TECHNICAL FIELD

The present invention relates to a universal work holding and positioning device that allows the user to rotate, tilt and swivel an item secured in the device when applying pressure to a spring loaded release.

RELATED APPLICATIONS

This application is related to co-owned U.S. utility application entitled "A Universal Work Positioning Device", to James C. West filed Feb. 2, 2005, provisional patent application Ser. No.; 60/649,432, the entire disclosure of which is incorporated herein by reference.

BACKGROUND OF THE INVENTION

A number of work positioning devices have been previously described such as for example the positioners of U.S. Pat. Nos.: 2,898,068, 5,314,174, 5,738,344 and 5,544,968. The support of U.S. Pat. No. 2,898,068 describes a device having a split ball-bushing configuration and having a clamping screw that engages the bushing locking the positioning post in place. Unfortunately, the screw clamp requires active interaction with the user to both release the bushing enabling movement of the item secured in the device and lock the bushing once the desired position is achieved. Further, it requires the user to apply a sufficient amount of pressure with the screw clamp to assure that the item remains in position. Unfortunately, if enough pressure is not applied, the positioner can fail and the item held in the device can be damaged.

U.S. Pat. Nos. 5,314,174 and 5,738,344 describe a workpiece positioner having a ball in socket configuration with a fluid chamber for providing fluidic pressure to release the positioning arm, permitting the arm to rotate and tilt up to 45 degrees from vertical. Unfortunately, these devices cannot tilt an item secured in the positioner greater than 45 degrees. In addition fluidic pressure control systems rely on a number of components to operate optimally for the system to function properly including for example gaskets which have a finite optimal operation lifetime and must be replaced, fluid level which must be monitored regularly and pressure hoses and lines that must be maintained.

Another device described in U.S. Pat. No. 5,544,968 is a positioning platform using a ball in socket configuration and a clamp ring positioned around the ball. Fluidic pressure is supplied to activate the rotation of the platform about the ball. Unfortunately in this configuration the device cannot tilt an item secured to the platform greater than 45 degrees. In addition, as with the other devices discussed, fluidic control systems have a number of components that require constant care and monitoring.

Consequently, there is a need for a universal positioner that does not use split ball screw clamping or a ball in socket configuration that limits the tilting capability to less than 45 degrees from vertical.

SUMMARY OF THE INVENTION

The present invention provides a workpiece positioner device comprising a spherical ball having an aperture, a upper spherical dome housing having a groove through said housing beginning at the apex of said dome and extending down the side of the housing to approximately 90 degrees from the apex, said spherical ball positioned within said spherical dome housing, a spherical seat positioned against said spherical ball in said upper spherical dome housing, at least one tension disc spring positioned against said spherical seat, a radial braking means positioned against said tension disc spring, a flange ring affixed to the base of said upper spherical dome housing securing the spherical ball, spherical seat, at least one tension disc spring and braking means in place within said spherical dome housing, a base secured to said braking means, a actuator lever connected to said spherical seat through said base, a cam and handle assembly connected to said actuator lever and a rod affixed within said aperture of said spherical ball.

In one embodiment, the breaking means is a round flat ring having an external perimeter edge, an internal perimeter edge and a depending skirt extending from its internal perimeter edge. The depending skirt preferably having at least two apertures for securing said breaking means to the base.

In another embodiment, pressing the actuator lever releases tension of the disc spring allowing the elements of the device to rotate freely, while releasing the actuator lever locks the elements of the device in place preventing movement.

DETAILED DESCRIPTION

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail.

The term "activating" as used herein when referring to the actuator lever generally means applying pressure to the lever resulting in depression of the disc spring releasing the pressure applied by the disc spring to the elements of the device allowing them to move freely.

The term "deactivating" as used herein when referring to the actuator lever generally means releasing the pressure exerted on the level resulting in reinitiating of the tension applied by the disc spring to the elements of the device locking them in place preventing movement.

The term "braking means" as used herein refers to a means for securing and releasing the spherical ball and spherical dome housing so that the item affixed to the device of the present invention may be swiveled, rotated, and tilted to a desired position by the user. Preferably the braking means uses force exerted by at least one tension disc spring to perform its function.

Figure 1:
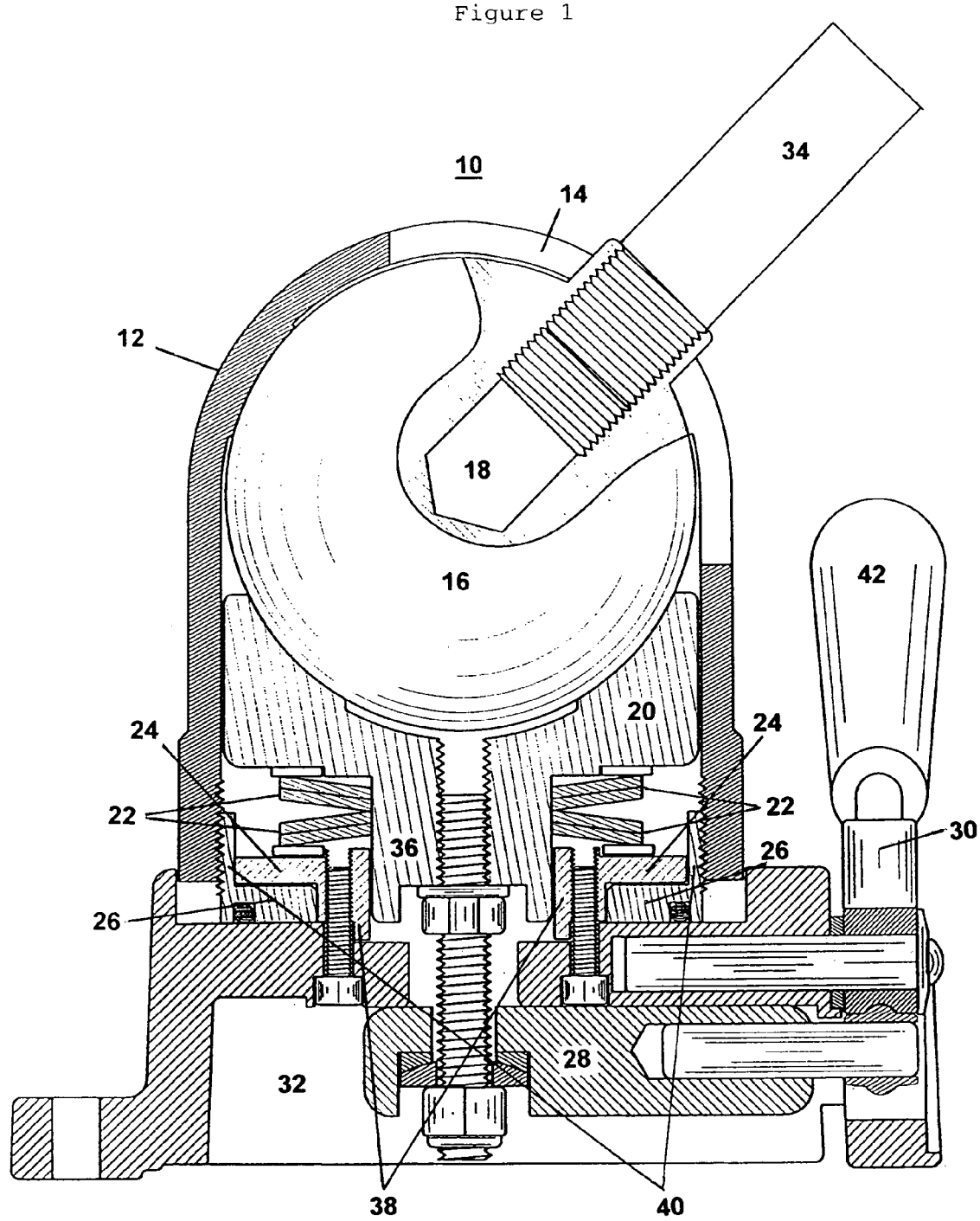
FIG. 1: Is a diagrammatic representation of the cross sectional side view of the present invention.
Figure 2:
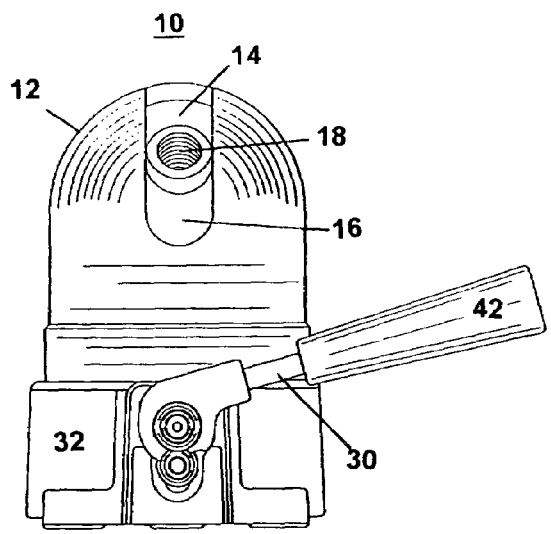
FIG. 2: Is a diagrammatic representation of (A) the top view of the present invention; (B) the left side view of the present invention; (C) the right side view of the present invention and (D) the bottom view of the present invention.
Figure 2:
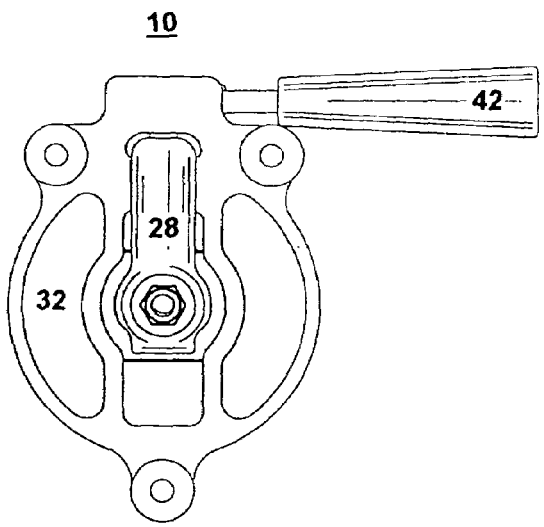
Figure 2:
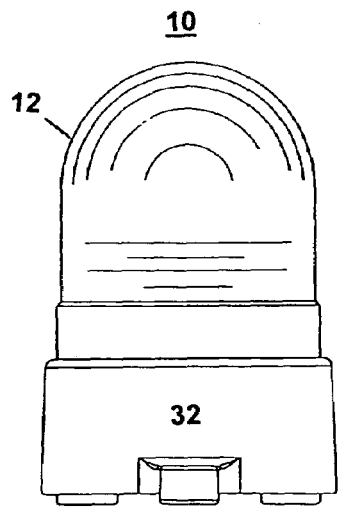
Figure 2:
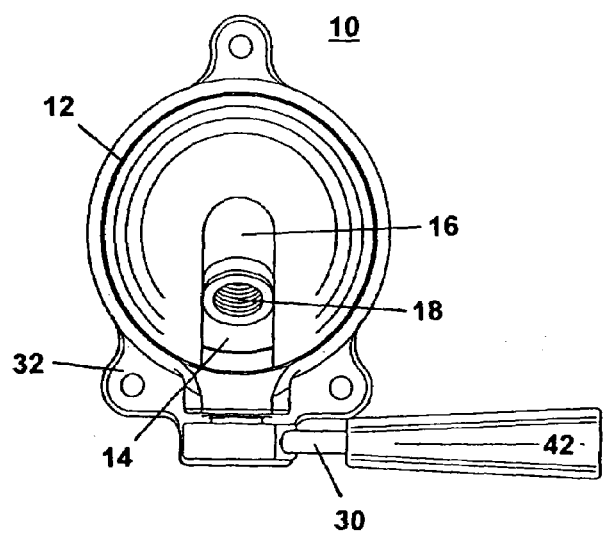

FIG. 1 is a cross sectional side view of preferred embodiment of the present invention. The universal workpiece positioner device 10 comprises a housing 12 having an upper spherical dome shape, a groove 14 provided in the spherical dome, a spherical ball 16 having an aperture 18, a spherical seat 20, at least one tension disc spring 22, a radial braking means 24, a flange ring 26, an actuator lever 28, a cam and handle assembly 30, a base 32 and a rod 34. The groove 14 provided through the housing 12 has a width slightly larger that the diameter of the rod and begins at the apex of the dome and extends down the side of the housing 12 in an arc to a position approximately 90 degrees from the apex. The groove 14 allows the rod 34 to rotate or pivot from a position about 90 degrees to the bottom surface of the base 32 to about parallel to the bottom surface of the base 32. The bottom of the housing is tooled to receive the flange ring 26. Tooling may include cutting of screw threads or providing a surface that will allow the flange ring 26 to be securely affixed to the bottom of the housing 12. One example would be to provide a smooth flat surface to allow affixing of the flange 26 and the housing 12 by adhesive.

The spherical ball 16 is provided in a diameter that fits snugly into the dome shaped upper potion of the housing 12 allowing free rotation of the ball 16 within the housing 12. The ball 16 also comprises an aperture able to receive the rod 34. During assembly, the ball 16 is placed in the housing 12 such that the rod 34 may be inserted and secured within the aperture of the ball 18 through the groove 14 of the housing.

The spherical seat 20 is a provided in a donut shape having an upper surface, a lower surface, an interior perimeter edge and an exterior perimeter edge. The upper surface is a concave spherical cavity of a diameter able to snugly receive the spherical ball 16. The interior perimeter edge has a depending skirt 36 that extends below the lower surface of the spherical seat 20. At the apex of the depending skirt is a means for affixing the lever 28 to the spherical seat 20 for drawing the seat away from the spherical ball 16. The lower surface is generally flat for interfacing with the at least one tension disc spring 22. The spherical seat 20 is positioned up against the spherical ball 16.

The means for affixing the lever 28 may be for example a screw or pin securely affixed within the depending skirt of the spherical seat 20 on one end and onto the lever 28 at the other.

The tension disc springs 22 are preferably high-tension limited travel disc springs. These have the advantage of requiring significantly less space for operation which allows for the novel work piece positioning device of the present invention to have a lower profile than similar devices utilizing coil springs. The tension disc springs 22 are positioned up against the lower surface of the spherical seat 20.

The radial braking means 24 is provided in a donut shape having an top surface, a bottom surface, an inner perimeter edge and an outer perimeter edge. The top surface is generally flat for interfacing with the at least one tension disc spring 22. The inner perimeter edge has a depending skirt 38 that extends below the lower surface of the radial braking means 24. The depending skirt comprises a means for affixing the radial braking means 24 to the base 32. The lower surface is generally flat for interfacing with the flange ring 26. The radial braking means 24 is positioned up against the tension disc springs 22.

The flange ring 26 is provided in a donut shape having a radial braking means interface surface, a base interface surface, an inside perimeter edge and an outside perimeter edge. The radial braking means interface surface is generally flat. The outside perimeter edge has an ascending skirt 40 that extends above the radial braking means interface surface. The ascending skirt comprises a means for affixing the flange ring 26 to the housing 12. The base interface surface is generally flat. The flange ring 26 is positioned between the braking means 24 and the base 32 affixed to the housing 12 securing the ball 16, spherical seat 20, at least one tension disc spring 22 and braking means 24 within the housing 12.

The base 32 has a top, a bottom, a perimeter edge, an aperture and a cavity on the bottom. The top has a generally circular portion for receiving the radial braking means 24 with an extended portion for securing a cam 30 and handle assembly 42. In addition the perimeter edge has at least three anchor mounts for receiving bolts that can be used to anchor the device to a workbench. The cavity on the bottom of the base 32 receives the actuator lever 28 having one end interfacing with the cam 30 on the handle assembly 42 and the other end connected to the depending skirt of the spherical seat 20 such that when the handle assembly 42 is activated the cam 30 draws the spherical seat 20 against the at least one tension disc spring 22 which are bracketed against the radial braking means 24. When the at least one tension spring 22 is compressed, the spherical ball 16 and housing 12 including the flange ring 26 are able to move freely. Once the handle assembly 42 is released, the pressure of the at least one tension disc spring 22 is restored and the spherical seat 20 presses against the ball 16 which presses against the housing 12, drawing the flange ring 26 against the bottom side of the radial braking means 24 restricting movement. The base 32 is positioned on, and secured to, the depending skirt of the radial braking means 24 bracketing the flange ring 26 of the housing 12 between the radial braking means 24 and the base 32.

The actuator lever 28 may be connected to the depending skirt of the spherical seat 20 by a rod or shaft secured in place by for example screw threads or adhesive.

The cam 30 is anchored to the extended portion of the base 32 by a shaft or pin and oriented perpendicular to the base 32. The cam 30 comprises an aperture for receiving the handle assembly and is configured as a wedge such that when the handle assembly 42 is activated by the user the cam 30 is driven between the base 32 and the shaft raising the actuator lever 28, compressing the at least one tension disc spring 22 and releasing the tension.

The handle assembly 42 comprises a leverage bar or shaft and a handle for gripping. One end of the leverage bar is affixed within the aperture of the cam 30 and a handle is affixed to the other end for comfort and ease of use.

The elements of the universal work positioner are preferably made of metal and may be die cast or machined. The selection of metal for each element is based on the purpose of the element being manufactured and the composition of the other elements that interface with that element. For example, for the at least one tension disc spring are designed to provide a metal disc with a torque or bend that is resilient and will retain its configuration over time with continued use. Because of this, the tension disc spring is preferably made of steel. The spherical seat is preferably made of aluminum or other lightweight metal such as titanium because of its bulk and the desire to keep the overall weight of the device to a minimum. However, since the lower surface of the spherical seat interfaces with the tension disc spring it is preferable that the lower surface have a resilient metal surface that prevents wear due to the difference in the two metals hardness. Consequently, it would be preferable that the lower surface of the spherical seat comprises a steel ring that protects the portion of the lower surface that interfaces directly with the tension disc spring. In view of this it is preferable that the housing, ball, spherical seat, radial braking means, flange ring, base, actuator lever and cam be made of a lightweight metal such as aluminum or titanium. It is also preferable that the tension disc springs, rod, shaft, leverage bar, pin, bolts and/or nuts be made of a more resilient material such as steel. Where the lightweight metal and more resilient metal interface, it is preferable that protectors of similar resilient metal be affixed to the lightweight metal to avoid unnecessary wear during normal use.

The universal work positioning device may be assembled by inserting the spherical ball into the housing such that the aperture in the ball is accessible through the groove in the dome shaped housing. Insert the rod into the aperture of the spherical ball. Position the spherical seat up against the spherical ball, position the at least one tension disc spring over the depending skirt of the spherical seat and up against the lower surface of the spherical seat. Position the radial braking means up against the at least one tension disc spring and secure the flange ring onto the base of the housing. Affix the base to the radial braking means and position the actuator lever in the cavity at the bottom of the base secure the actuator lever to the spherical seat through the aperture in the base by a shaft. Secure the cam to the base by a pin and insert the leverage bar onto the aperture in the cam. Then secure the handle to the remaining end of the leverage bar.

To test the universal work positioning device apply downward pressure on the leverage bar using the handle. This should drive the cam wedge between the pin and base drawing the actuator lever down pulling the spherical seat downward compressing the at least one tension disc spring between the radial braking means and the lower surface of the spherical seat releasing the pressure on the ball and housing allowing them to move freely. When the leverage bar is released, the pressure is reinstated by the at least one tension disc spring and the movement is ceased.

I claim:

1. A workpiece positioner device comprising a spherical ball having an aperture, a upper spherical dome housing having a groove through said housing beginning at the apex of said dome and extending down the side of the housing to approximately 90 degrees from the apex, said spherical ball positioned within said spherical dome housing, a spherical seat positioned against said spherical ball in said upper spherical dome housing, at least one tension disc spring positioned against said spherical seat, a radial braking means positioned against said tension disc spring, a flange ring affixed to the base of said upper spherical dome housing securing the spherical ball against said spherical seat, at least one tension disc spring and braking means in place within said spherical dome housing, a base secured to said braking means, a actuator lever connected to said spherical seat through said base, a cam and handle assembly connected to said actuator lever and a rod affixed within said aperture of said spherical ball.

2. A workpiece positioner device according to claim 1 wherein said braking means is a round flat ring having an external perimeter edge, an internal perimeter edge and a depending skirt extending from said internal perimeter edge.

3. A workpiece positioner device according to claim 2 wherein said depending skirt comprises at least two apertures for securing said breaking means to said base.

4. A workpiece positioner device according to claim 1 wherein said actuator lever when activated releases tension of said disc spring allowing the elements of said device to rotate freely and deactivating said actuator lever locks said elements of said device in place preventing movement.

* * * * *